W. MÜLLER.
PIPE CLEANER.
APPLICATION FILED JULY 9, 1920.
1,419,886. Patented June 13, 1922.
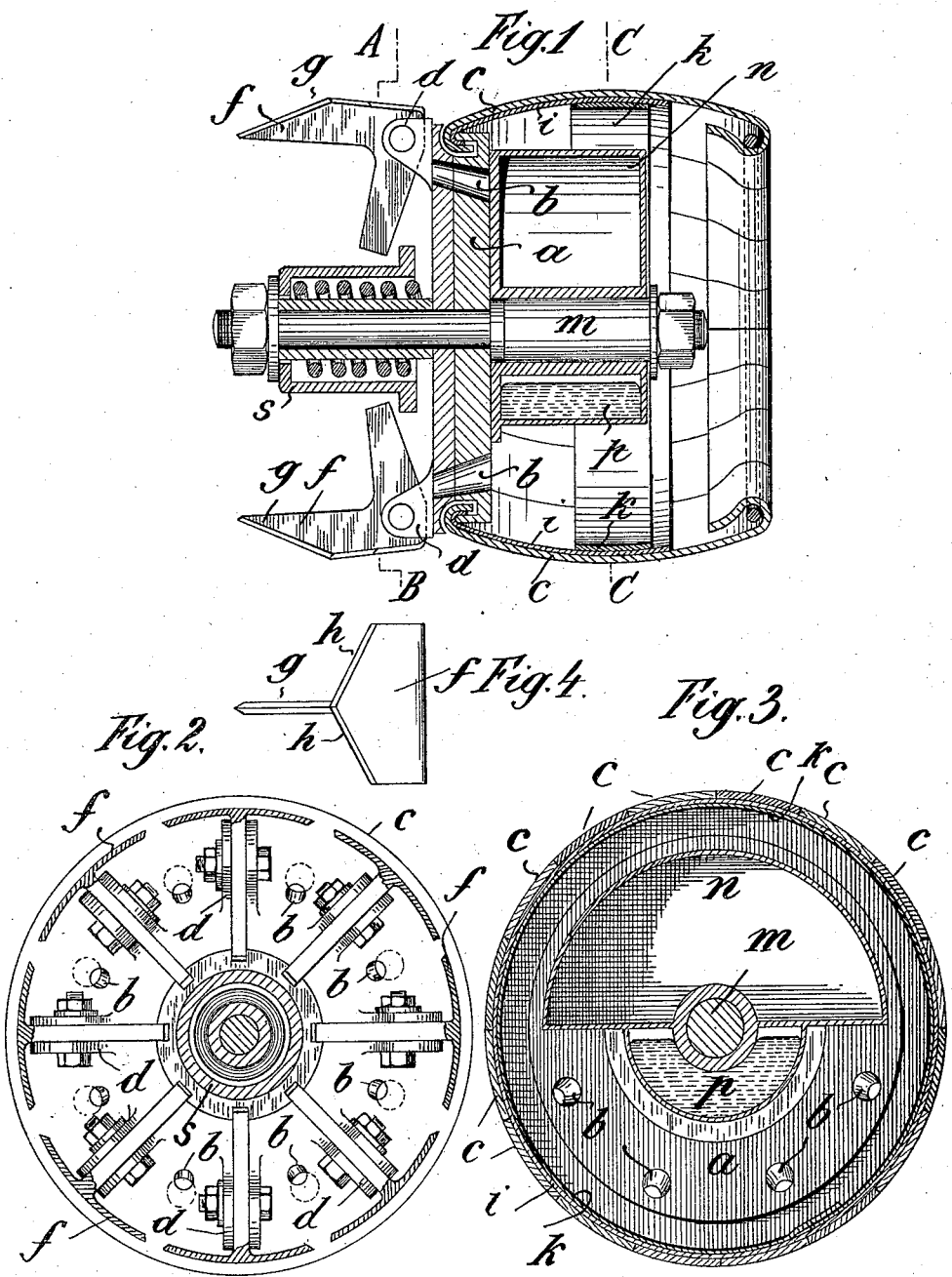

UNITED STATES PATENT OFFICE.

WILHELM MÜLLER, OF BERNBURG, GERMANY.

PIPE CLEANER.

1,419,886.  Specification of Letters Patent.  Patented June 13, 1922.

Application filed July 9, 1920. Serial No. 395,128.

*To all whom it may concern:*

Be it known that I, WILHELM MÜLLER, engineer, a citizen of the German Republic, residing at Bernburg a. S., have invented certain new and useful Improvements in Pipe Cleaners (for which I filed applications in Germany Sept. 15, 1916, and in Austria June 27, 1917), of which the following is a specification.

The heretofore employed pipe cleaners cannot be very well used for the wide and long pipe lines, such as are generally used in chemical works, and through which thickly liquid products or residues are conveyed, in particular when the said materials are to be at the same time employed as pressure medium, because the viscidity of these materials requires a wide section of the pipes. Furthermore it must be remembered that the deposits in such pipes will not appear evenly on all sides, as in water pipes, but will more frequently be found on the bottom of the pipes. It is therefore advisable that the pressure medium passing through the pipe cleaner should not pass through such cleaner uniformly around its whole periphery but chiefly through the lower part thereof, so that the jet of liquid emerging therefrom will wash away the slackened or loosened deposits. The pipe cleaner according to the present invention is intended to meet this requirement and is therefore provided at its front end with suitable blades, by which the deposits will be ripped or torn open longitudinally to the pipe and thereupon peeled off the pipe wall. The pipe cleaner is, furthermore, provided with a counterbalanced shutter rocking on a horizontal axis by means of which the upper orifices are closed, so that the liquid is in a positive manner made to pass through the lower orifices only. The said shutter may be made either of a disc having a counterweight or in form of a hollow body acting as a float, and in this case the balancing may be obtained either by a counterweight or by providing a small hollow chamber adapted to be filled with a heavier metal, for example lead, mercury or the like. The last described form of shutter, viz, as a float affords various advantages for the following reasons:

If the shutter is made massive, its counterweight will have to be correspondingly larger and thereby the clear passage for the liquid through the lower, not closed orifices is reduced. When the float type of shutter is employed, the counterweight need not be as large and therefore the clear passage of the orifices is not reduced. Besides it must be remembered that the air contained in the pipe line is compressed and will be forced to the outlet only after the pipe has been completely filled. Therefore partly air and partly liquid will be forced at first against the pipe cleaner. As soon as the air acts against the pipe cleaner, the latter will, at least on the pressure side, not be within the liquid but only within air, and the float would upset, that is to say, the shutter made in form of a float would not fulfill its purpose, if it were not provided with a counterweight.

In the accompanying drawing an embodiment of the present invention is shown by way of example.

Figure 1 is a longitudinal section,

Fig. 2 is a cross section on the line A—B,

Fig. 3 is a cross section on the line C—D in Fig. 1.

Fig. 4 is a top view of one of the blades.

The pipe cleaner according to the present invention consists of a head plate $a$. In this head plate are provided orifices $b$, and on the front face thereof ears $d$ in which the knife blades $f$ are pivoted. A sleeve $s$, axially displaceable and acted upon by a spring $t$ tends to hold the said blades in a spread position. The said blades have a knife edge $g$ somewhat inclined towards the axis of the cleaner, but extending longitudinally thereto, and two transverse knife edges $h$, connected therewith. The knife edge $g$ is intended to rip open the deposits longitudinally to the pipe, whereupon the knife edges $h$ will peel off these deposits from the wall of the pipe.

To the said head plate are also attached sections $c$ extending rearwards in known manner and provided with a close lining $i$, against which presses from inside an elastic ring $k$.

In the embodiment shown by way of example a drum having the form of a segment $n$ is fitted easily rockable on the central pin of the pipe cleaner. Close to the axis of said drum $n$ is provided a chamber $p$, intended to receive a heavy metal. In consequence of such arrangement the drum will have the tendency to assume the position shown in Fig. 3, in particular when the pipe is filled with a liquid. When the drum is in such position the upper orifices $b$ will be closed, whereby the intended purpose is secured, the lower orifices being left open and the liquid being allowed to pass therethrough only.

This device operates as follows: It is introduced into the tube or pipe to be cleaned and forced through it by means of a liquid such as water, under pressure. The segments c are thereby forced outwards and form a tight packing, thus causing the water to escape with great force through the apertures b. As the device proceeds on its way through the tube or pipe, the cutters g cut through the deposits formed on the walls longitudinally, while the edges h peel them off the walls. The deposits accumulating in front of the lower part of the head plate a are carried away by the jets of water escaping through the apertures b. Owing to the apertures in the upper part of the head plate being closed by the drum n, all the water is compelled to escape through the lower part of the plate.

I wish it to be understood that I do not desire to be limited to the exact details of construction shown and described for obvious modifications will occur to a person skilled in the art.

I claim:

1. In a device of the kind described in combination, a head having, a circular row of orifices therein and means for automatically closing those orifices which are uppermost for the time being.

2. In a device of the kind described in combination, a head having, a circular row of orifices therein and a counter-weighted shutter adapted to automatically close those orifices which are uppermost for the time being.

3. In a device of the kind described in combination, a head having, a circular row of orifices therein, a journal pin on said head in the centre of said row of orifices, a rotary drum excentrically mounted on said pin so as to cover part of said orifices, and a heavy metal in the part of said drum adjoining said journal pin.

4. In a device of the kind described in combination, a head having, a circular row of orifices therein, means for automatically closing those orifices which are uppermost for the time being, and cutters pivotally mounted on said head, each cutter having an edge extending in axial direction and another one extending transversely thereto.

5. In a device of the kind described in combination, a head having, a circular row of orifices therein, means for automatically closing those orifices which are uppermost for the time being, cutters pivotally mounted on said head, each cutter having an edge extending in axial direction and another one extending transversely thereto and resilient means for pressing said cutters outwards.

6. In a device of the kind described in combination, a head, having a circular row of orifices therein, a journal pin on said head in the centre of said row of orifices, a rotary counter-weighted drum on said pin adapted to automatically close those orifices which are uppermost for the time being and cutters pivotally mounted on said head, each cutter having an edge extending in axial direction and another one extending transversely thereto.

7. In a device of the kind described in combination, a head, having a circular row of orifices therein, a journal pin on said head in the centre of said row of orifices, a rotary drum excentrically mounted on said pin so as to cover part of said orifices, a heavy metal in the part of said drum adjoining said journal pin and cutters pivotally mounted on said head, each cutter having an edge extending in axial direction and another one extending transversely thereto.

In testimony whereof I affix my signature.

WILHELM MÜLLER.